United States Patent
Miyanomae

(10) Patent No.: US 11,637,944 B2
(45) Date of Patent: Apr. 25, 2023

(54) IMAGE PROCESSING APPARATUS, IMAGE PROCESSING METHOD, AND NON-TRANSITORY COMPUTER-READABLE STORAGE MEDIUM FOR GENERATING INTERMEDIATE DATA BASED ON PRINT DATA

(71) Applicant: CANON KABUSHIKI KAISHA, Tokyo (JP)

(72) Inventor: Takashi Miyanomae, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/838,484

(22) Filed: Jun. 13, 2022

(65) Prior Publication Data
US 2022/0311900 A1    Sep. 29, 2022

Related U.S. Application Data

(63) Continuation of application No. 17/148,936, filed on Jan. 14, 2021, now Pat. No. 11,405,520.

(30) Foreign Application Priority Data

Jan. 24, 2020    (JP) ............................. JP2020-010327

(51) Int. Cl.
*H04N 1/21*    (2006.01)
*G06K 15/02*    (2006.01)

(52) U.S. Cl.
CPC ........... *H04N 1/21* (2013.01); *G06K 15/1809* (2013.01); *G06K 15/1828* (2013.01); *G06K 15/1849* (2013.01); *G06K 15/1871* (2013.01)

(58) Field of Classification Search
None
See application file for complete search history.

(56) References Cited

U.S. PATENT DOCUMENTS

| | | | |
|---|---|---|---|
| 2002/0163666 A1 | 11/2002 | Iwata et al. | |
| 2007/0033341 A1* | 2/2007 | Hashimoto | ......... G06F 12/0873 711/E12.019 |
| 2017/0243089 A1 | 8/2017 | Takenaka | |

FOREIGN PATENT DOCUMENTS

| | | |
|---|---|---|
| JP | H06-261202 A | 9/1994 |
| JP | 2010280084 A | 12/2010 |
| JP | 2011-061555 A | 3/2011 |
| JP | 2017-194932 A | 10/2017 |
| JP | 2018-152113 A | 9/2018 |

* cited by examiner

*Primary Examiner* — Lennin R Rodriguezgonzalez
(74) *Attorney, Agent, or Firm* — Carter, DeLuca & Farrell LLP

(57) ABSTRACT

An image processing apparatus comprises a generation unit configured to generate, based on print data, pieces of information to be used for generating intermediate data based on the print data, and store the pieces of information in an external storage device connected to the image processing apparatus, and a rendering unit configured to generate the intermediate data using the pieces of information, and generate a raster image by performing rendering based on the generated intermediate data.

8 Claims, 14 Drawing Sheets

F I G. 1
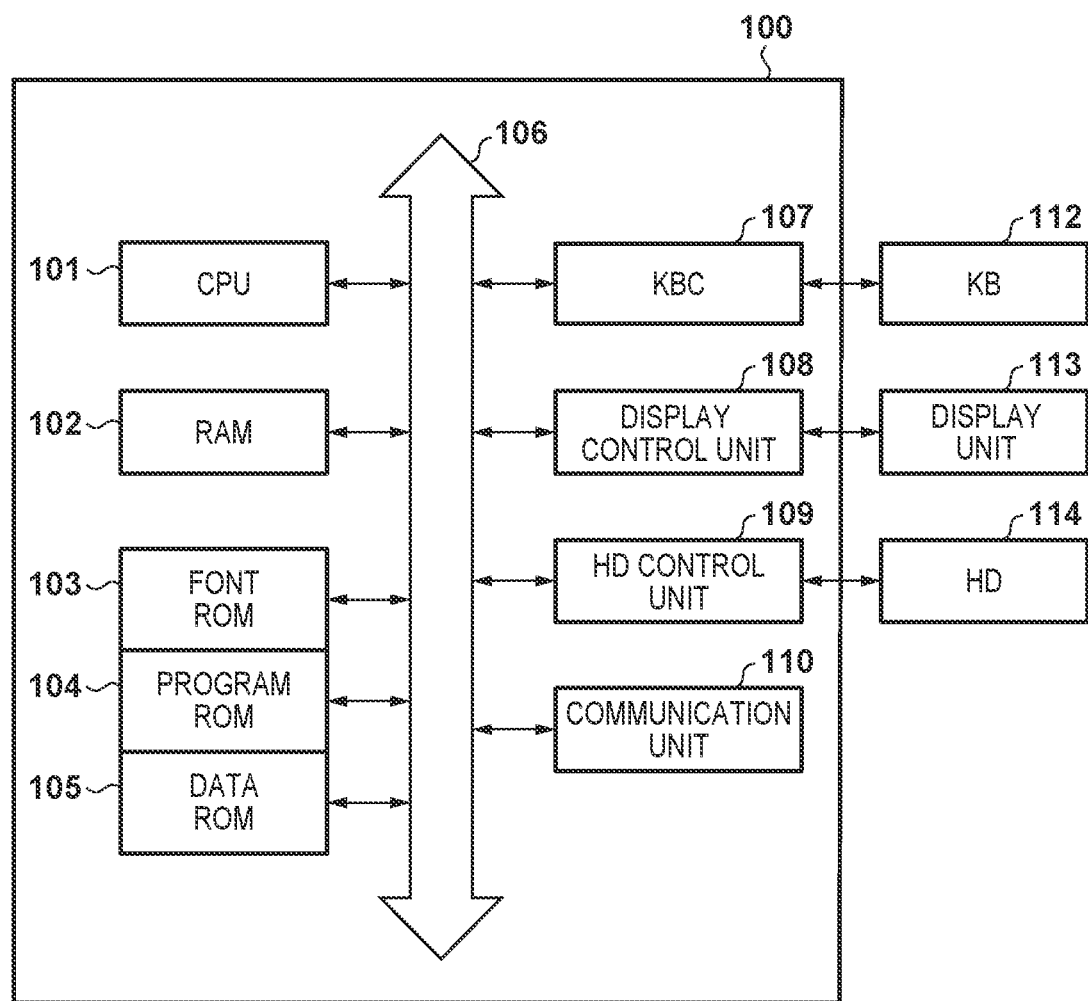

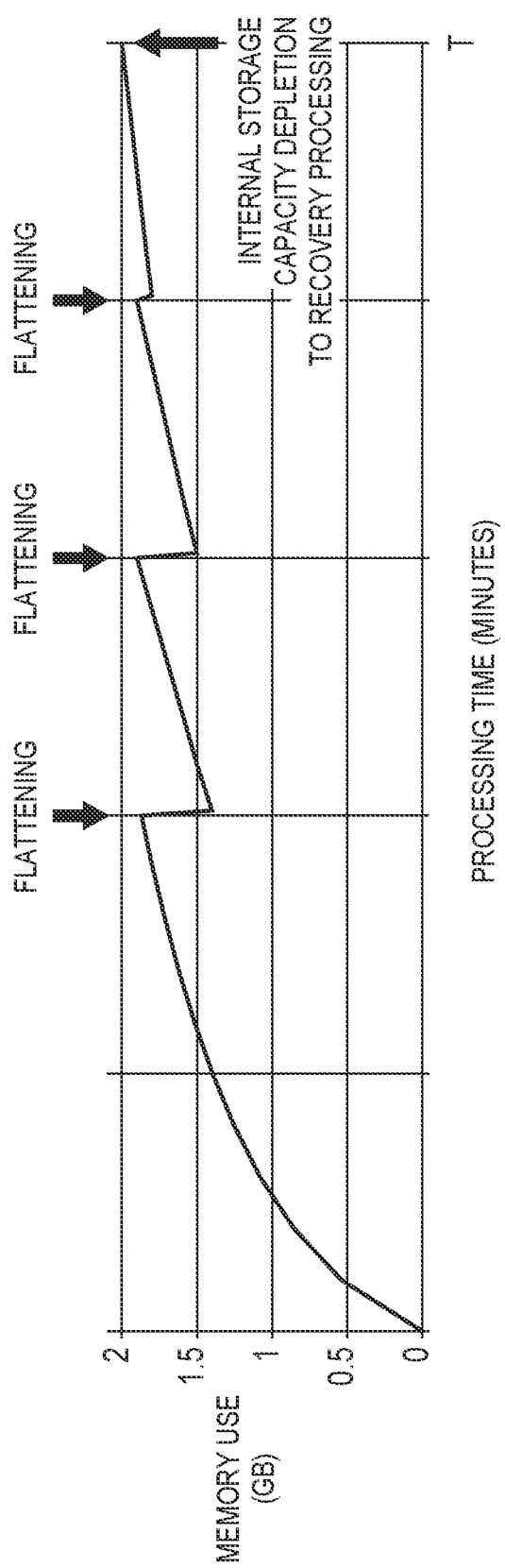

IMAGE PROCESSING APPARATUS, IMAGE PROCESSING METHOD, AND NON-TRANSITORY COMPUTER-READABLE STORAGE MEDIUM FOR GENERATING INTERMEDIATE DATA BASED ON PRINT DATA

CROSS REFERENCE TO RELATED APPLICATIONS

This application is a continuation of U.S. patent application Ser. No. 17/148,936, filed on Jan. 14, 2021, which claims the benefit of and priority to Japanese Patent Application No. 2020-010327, filed Jan. 24, 2020, each of which is hereby incorporated by reference herein in their entirety.

BACKGROUND OF THE INVENTION

Field of the Invention

The present invention relates to generation of intermediate data based on print data.

Description of the Related Art

A printer device such as a large-format printer that uses particularly large size print sheets may encounter a case where printing turns out to be difficult even when a print job is input. Particularly, in a case where a very large image is embedded or a large amount of graphic data or the like are involved in a page of the job, memory shortage may occur in the course of processing the page, preventing continuation of the processing. Generally, printer drivers or printer controllers are all configured to perform processing with pre-defined hardware resources (e.g., there is a limit on the memory allocated to a process), and therefore it is necessary to take some measures.

Conventionally, there is known a method described in Japanese Patent Laid-Open No. 2011-61555 and Japanese Patent Laid-Open No. 06-261202 as an example of measures to be taken when memory shortage occurs during processing of a print job, preventing continuation of processing. Japanese Patent Laid-Open No. 2011-61555 discloses a method such as reducing data size by a processing program that performs, at the time point when memory shortage occurs (such as failure of memory allocation), image formation (rendering) using internal data (intermediate data or the like) recorded in the memory so as to release the data accumulated until occurrence of memory shortage. In addition to such techniques, there is also proposed a method for reducing (flattening) date size by composition processing (Japanese Patent Laid-Open No. 2018-152113 and Japanese Patent Laid-Open No. 2017-194932).

A configuration example of a conventional printing system will be described, referring to the block diagram of FIG. 2A. The printing system illustrated in FIG. 2A includes a computer 200 and an image processing apparatus 100.

A generation unit 201 included in the computer 200 generates print data 203 from print target data 202. The image processing apparatus 100 includes an input unit 204, an analysis unit 205, a processing unit 206, and an output unit 207. The input unit 204 receives the print data 203 generated by the generation unit 201. The analysis unit 205 analyzes the print data 203 received by the input unit 204, and extracts a drawing instruction. The processing unit 206 includes a generation unit 208 and a rendering unit 209. The generation unit 208 extracts drawing information 210 and an image 211 from the drawing instruction extracted by the analysis unit 205 and generates intermediate data. When generating the intermediate data, the generation unit 208 generates internal data for generation of the intermediate data. Such data are usually stored in a RAM in the image processing apparatus 100. FIG. 4 illustrates how memory usage is reduced by flattening. Performing flattening reduces memory usage, thereby allowing continuation of processing.

As has been described above, data reduction is performed by a degeneration process (such as a process that holds internal data to be used for processing intermediate data as a structure similar to the intermediate data to be eventually spooled-out, and integrates the internal data by a process called flattening when memory shortage occurs) of the internal memory to continue image processing. However, such a scheme requires execution of flattening again as available memory gradually decreases. In the worst case, flattening is repeated.

FIG. 6 is a graph showing an example of memory shortage as a result of repeated flattening. The vertical axis indicates usage (GB) of the memory, and the horizontal axis indicates processing time (minutes). Here, the maximum value of 2 GB along the vertical axis is assumed to be the maximum capacity of the memory in this example. Flattening has occurred three times to reduce memory usage, and the memory usage has reached the maximum value of 2 GB at the processing time T, resulting in memory shortage. There exists a case where memory shortage occurs even when flattening has been performed as described above, preventing continuation of processing.

SUMMARY OF THE INVENTION

The present invention provides a technique that, even for such print data that causes memory shortage and prevents continuation of image processing, allows for generation of intermediate data based on the print data.

According to the first aspect of the present invention, there is provided an image processing apparatus comprising: a generation unit configured to generate, based on print data, pieces of information to be used for generating intermediate data based on the print data, and store the pieces of information in an external storage device connected to the image processing apparatus; and a rendering unit configured to generate the intermediate data using the pieces of information, and generate a raster image by performing rendering based on the generated intermediate data.

According to the second aspect of the present invention, there is provided an image processing method performed by an image processing apparatus, comprising: generating, based on print data, pieces of information to be used for generating intermediate data based on the print data, and storing the pieces of information in an external storage device connected to the image processing apparatus; and generating the intermediate data using the pieces of information, and generating a raster image by performing rendering based on the generated intermediate data.

According to the third aspect of the present invention, there is provided a non-transitory computer-readable storage medium having stored therein a computer program for causing a computer of an image processing apparatus to function as: a generation unit configured to generate, based on print data, pieces of information to be used for generating intermediate data based on the print data, and store the pieces of information in an external storage device connected to the image processing apparatus; and a rendering unit configured to generate the intermediate data using the pieces of information, and generate a raster image by performing rendering based on the generated intermediate data.

Further features of the present invention will become apparent from the following description of exemplary embodiments with reference to the attached drawings.

BRIEF DESCRIPTION OF THE DRAWINGS

FIG. 1 is a block diagram illustrating a hardware configuration example of a computer apparatus;

FIG. 6 is a graph showing an example of memory shortage that occurs as a result of repeated flattening;

DESCRIPTION OF THE EMBODIMENTS

Figure 2A:
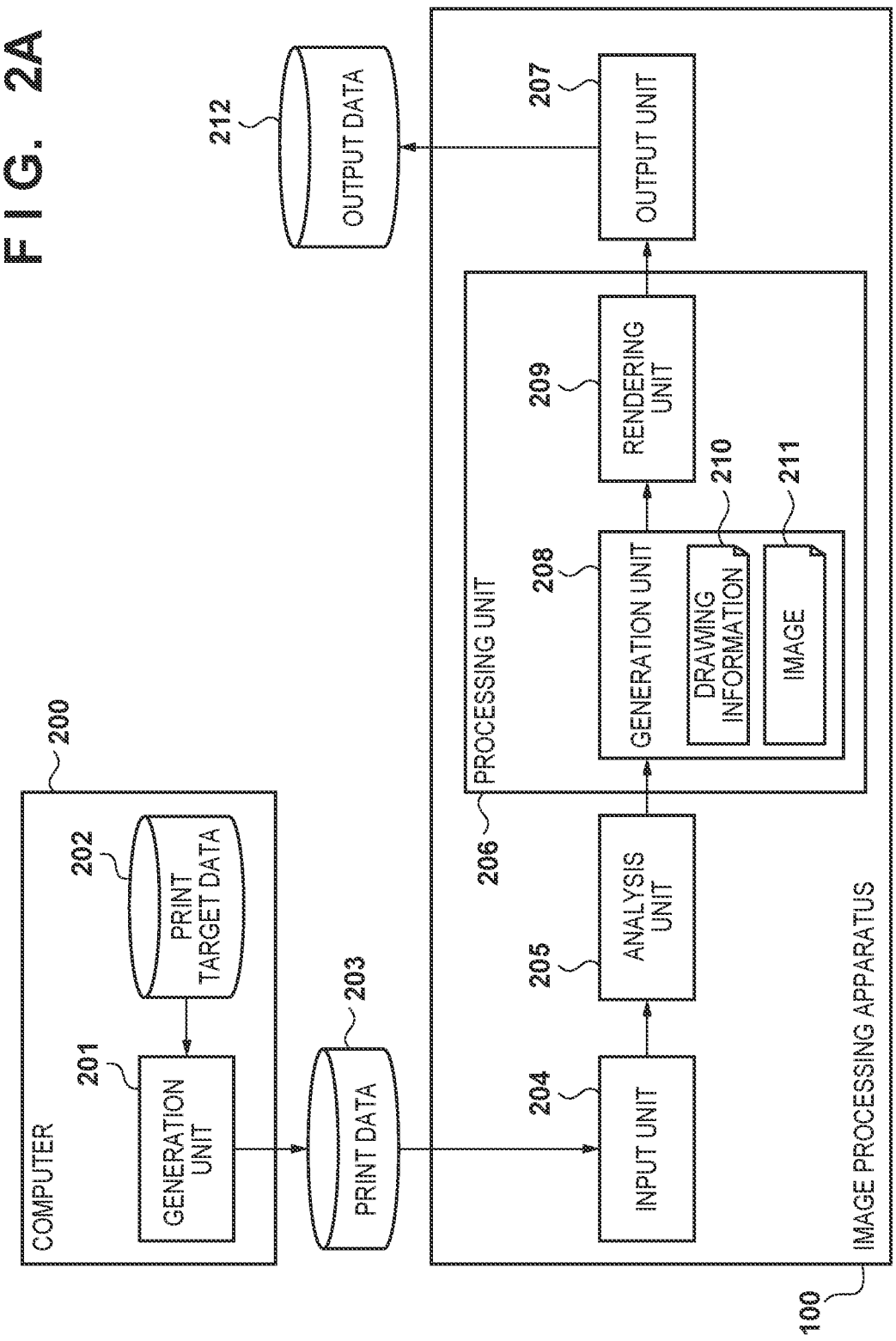
FIG. 2A is a block diagram illustrating a configuration example of a conventional printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 2B:
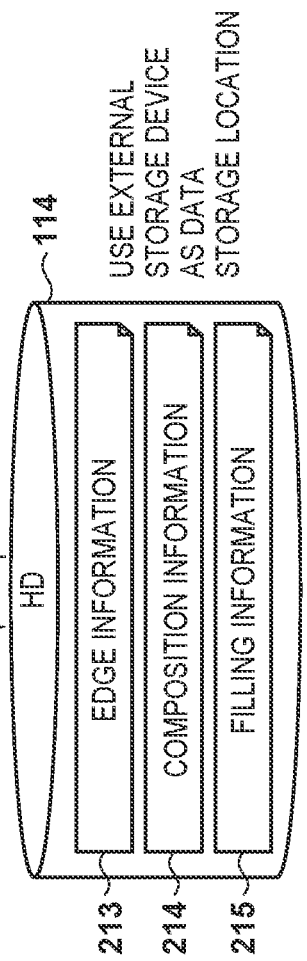
FIG. 2B is a block diagram illustrating a configuration example of a printing system according to a first embodiment.

First, there will be described a configuration example of a printing system according to the present embodiment, referring to the block diagram of FIG. 2B. As illustrated in FIG. 2B, the printing system according to the present embodiment includes a computer 200 and an image processing apparatus 100. The computer 200 and the image processing apparatus 100, being connected to a wireless and/or wired network, are configured to allow for data communication with each other via the network.

First, the computer 200 will be described. Print target data 202 is data to be printed, such as images or texts. A generation unit 201 generates print data 203 from the print target data 202 and outputs the generated print data 203 to the image processing apparatus 100.

Next, the image processing apparatus 100 will be described. An input unit 204 acquires the print data 203 output from the computer 200. An analysis unit 205 analyzes the print data 203 and generates a drawing instruction (drawing command).

A processing unit 250 includes a generation unit 251 and a rendering unit 252. The generation unit 251 is configured to extract drawing information 210 and an image 211 from the drawing command and generate intermediate data. The generation unit 251 stores, as appropriate, pieces of information to be used for generating intermediate data in an HD (hard disk) 114 which is an external storage device, and generates intermediate data using the stored pieces of information. The pieces of information may be referred to as internal data in the following. The rendering unit 252 generates a raster image by performing rendering based on the intermediate data generated by the generation unit 251.

An output unit 207 outputs the raster image generated by the rendering unit 252 as output data 212. The output destination of the output data is not limited to a specific output destination. For example, the output unit 207 may output the output data 212 to a printing unit provided inside or outside the image processing apparatus 100, and print images or characters based on the output data 212 on a printing medium such as paper. The output unit 207 may output the output data 212 to a memory provided inside or outside the image processing apparatus 100.

Each of the functional units of the image processing apparatus 100 described above may be implemented in the form of hardware, and they may also be implemented in the form of software (computer program). In the latter case, a computer apparatus that can execute the computer program may be applied to the image processing apparatus 100. Next, the latter case will be described. A hardware configuration example of such a computer apparatus will be described, referring to the block diagram of FIG. 1.

A CPU 101 performs various processes using computer programs and data stored in a RAM 102 or a ROM (font ROM 103, program ROM 104, and data ROM 105). Accordingly, the CPU 101 controls the operation of the entire image processing apparatus 100 as well as executing or controlling respective processes described as being performed by the image processing apparatus 100. Although the CPU 101 of the present embodiment is assumed to be a multi-core CPU here, the image processing apparatus 100 may include a plurality of CPUs.

The RAM 102 includes an area for storing computer programs and data loaded from the ROM (font ROM 103, program ROM 104, and data ROM 105) or the HD 114. Furthermore, the RAM 102 has an area for storing computer programs and data received from the outside (e.g., the computer 200 described above) by the communication unit 110. The RAM 102 also includes a work area used when the CPU 101 executes various processing. In this way, the RAM 102 may provide various areas as appropriate.

The font ROM 103 has stored therein various font data. The program ROM 104 has stored therein a computer program that causes the CPU 101 to execute or control respective processes described as being executed by the image processing apparatus 100. The data ROM 105 has stored therein data that causes the CPU 101 to execute and control respective processes described as being executed by the image processing apparatus 100.

A KBC (keyboard controller) 107 notifies the CPU 101 of instructions and information input via a user operation on a KB 112. Here, the user interface usable on the image processing apparatus 100 is not limited to a keyboard, and a mouse, a touch panel screen, or the like are also applicable.

A display control unit 108 performs display control of a display unit 113. The display unit 113, being a display device with a display screen such as a liquid crystal screen or a touch panel screen, can display results of processing by the CPU 101 in the form of images, characters, or the like. Here, the display unit 113 may be a projection device such as a projector that projects images or characters.

An HD control unit 109 controls reading and writing of computer programs and data from and to the HD 114. The HD 114 can store various computer programs and data. Here, the HD 114 is an example of an external storage device connected to the image processing apparatus 100, and any other type of memory device may also be used.

The communication unit 110 performs data communication with the computer 200. The CPU 101, the RAM 102, the font ROM 103, the program ROM 104, the data ROM 105, the KBC 107, the display control unit 108, the HD control unit 109, and the communication unit 110 are all connected to a bus 106.

Figure 5:
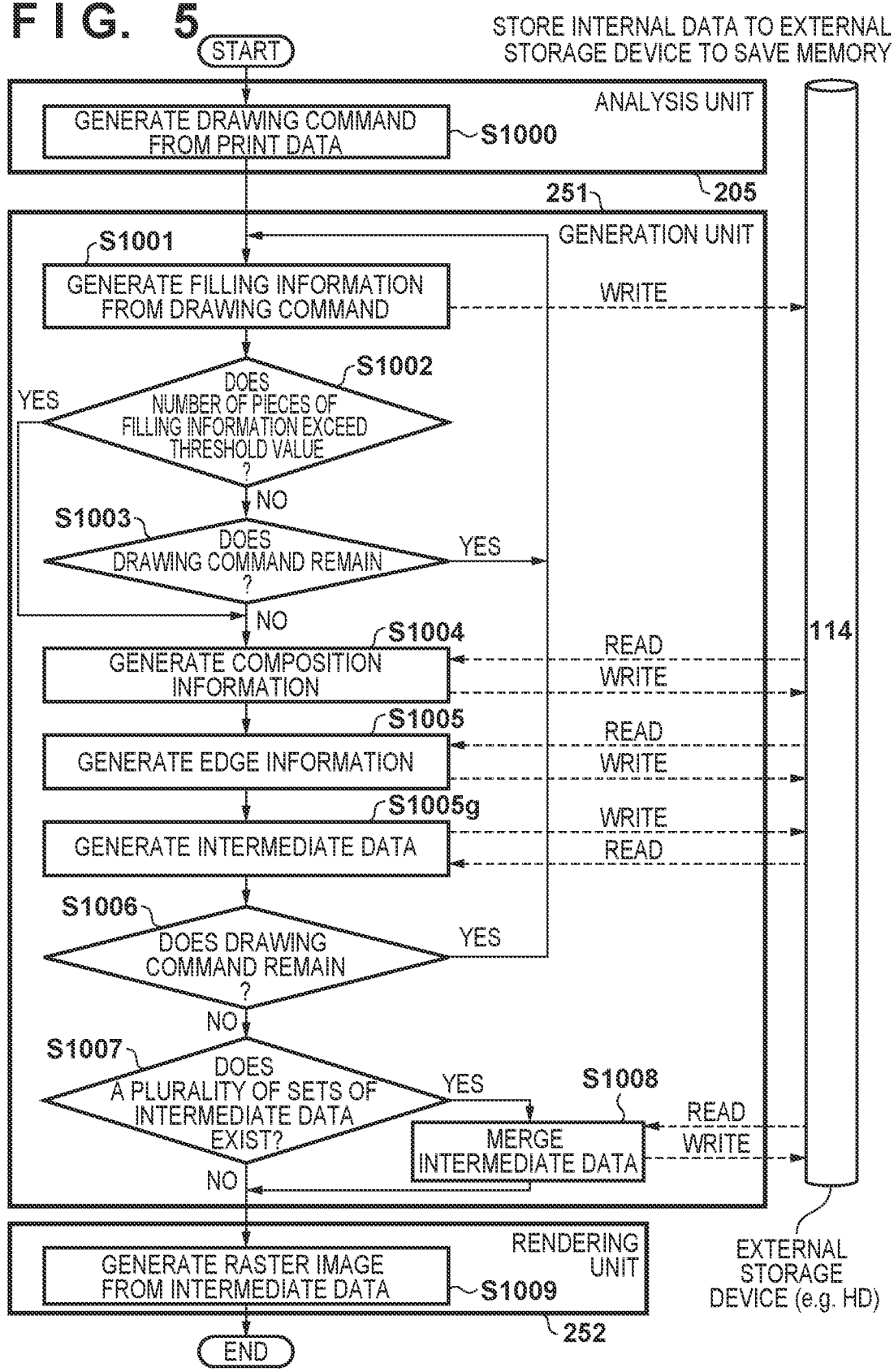
FIG. 5 is a flowchart showing an operation of an image processing apparatus 100.

Next, there will be described an operation of the image processing apparatus 100, in accordance with the flowchart of FIG. 5. The process at step S1000 is performed by the analysis unit 205. At step S1000, the analysis unit 205 analyzes the print data 203, and generates a drawing instruction (drawing command) for each page.

The processes at steps S1001 to S1008 are performed by the generation unit 251. At step S1001, the generation unit 251 generates, from a drawing command of a page, filling information related to filling of the page, and stores the generated filling information in the HD 114.

At step S1002, the generation unit 251 determines whether or not the number of pieces of filling information in the page generated at step S1001 has exceeded a threshold value. In a case where, as a result of the determination, the number of pieces of filling information in the page generated at step S1001 has exceeded the threshold value, the processing proceeds to step S1004, or the processing proceeds to step S1003 in a case where the number of pieces of filling information in the page generated at step S1001 has not exceeded the threshold value.

At step S1003, the generation unit 251 determines whether or not there remains a drawing command of a page yet to be subjected to step S1001. In a case where, as a result of the determination, there remains a drawing command of a page yet to be subjected to step S1001, the processing proceeds to step S1001. On the other hand, in a case where there remains no drawing command of a page yet to be subjected to step S1001, the processing proceeds to step S1004.

At step S1004, the generation unit 251 generates, from a drawing command of a page, composition information related to composition of objects on the page, and stores the generated composition information in the HD 114.

At step S1005, the generation unit 251 generates, from a drawing command of a page, edge information related to edges of objects on the page, and stores the generated edge information in the HD 114.

Figure 3:
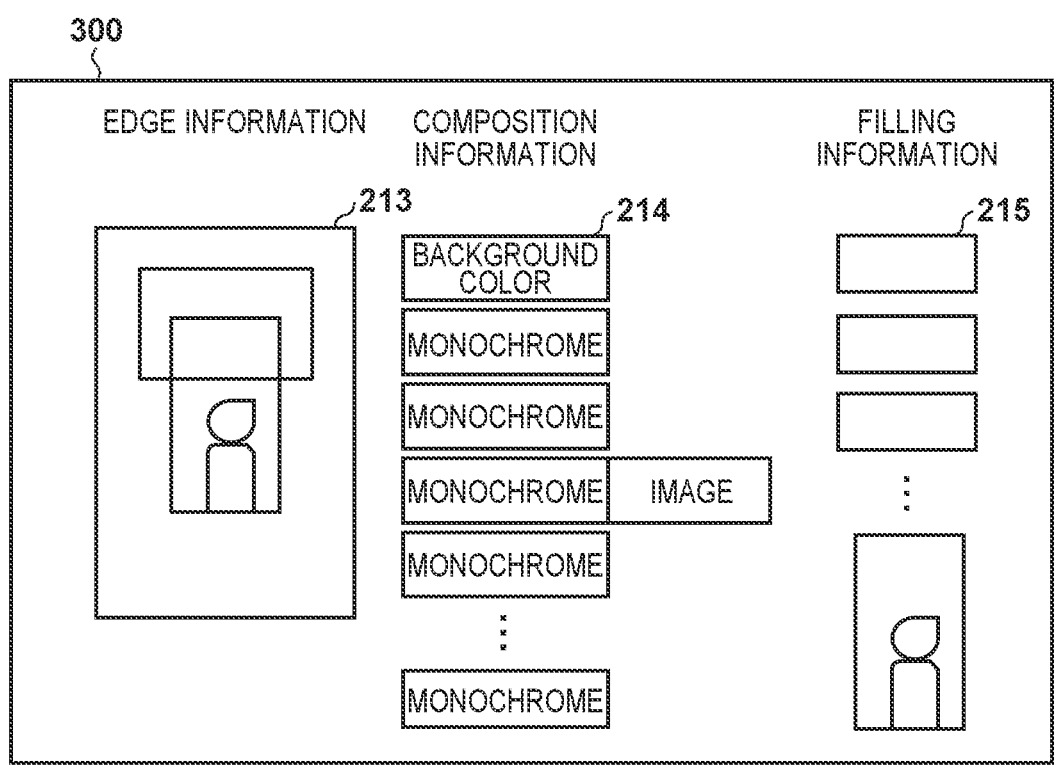
FIG. 3 illustrates a configuration example of internal data.

The present embodiment thus stores, as internal data in the HD 114, the pieces of information (filling information, composition information, and edge information) to be used for generating intermediate data from a drawing command A configuration example of the internal data is illustrated in FIG. 3. As illustrated in FIG. 3, internal data 300 includes edge information 213, composition information 214, and filling information 215.

At step S1005g, the generation unit 251 generates intermediate data of the page, referring to the aforementioned internal data stored in the HD 114 as appropriate, and stores the generated intermediate data in the HD 114.

At step S1006, the generation unit 251 determines whether or not there remains a drawing command of a page yet to be subjected to step S1001. In a case where, as a result of the determination, there remains a drawing command of a page yet to be subjected to step S1001, the processing proceeds to step S1001. On the other hand, in a case where there remains no drawing command of a page yet to be subjected to step S1001, the processing proceeds to step S1007.

At step S1007, the generation unit 251 determines whether or not there exists a plurality of sets of generated intermediate data. In a case where there exists a plurality of sets of generated intermediate data as a result of the determination, the processing proceeds to step S1008, or the processing proceeds to step S1009 in a case where there exists a single set of intermediate data.

At step S1008, the generation unit 251 merges the "plurality of sets of intermediate data" stored in the HD 114 into a single set of intermediate data and stores, in the HD 114, the single set of intermediate data generated by the merging.

At step S1009, the rendering unit 252 generates a raster image by performing rendering using the intermediate data stored in the HD 114. The generated raster image is output by the output unit 207 to an appropriate output destination as the output data 212.

Second Embodiment

In the following embodiments including the present embodiment, only the parts different from the first embodiment will be described, assuming that the other parts are similar to the first embodiment unless otherwise stated below. The image processing apparatus 100 according to the present embodiment has a first mode for generating intermediate data while holding the internal data in the memory (RAM 102) without evacuating the internal data to the HD 114, and a second mode for evacuating the internal data to the HD 114 to generate the intermediate data. Subsequently, the image processing apparatus 100 operates in the first mode from the first page and, in a case where memory shortage has occurred at a page midway through the job processing, switches to operation in the second mode with regard to the page. Although, in the present embodiment, the RAM 102 is referred to as a "memory", the "memory" may be other types of volatile memory.

Figure 7A:
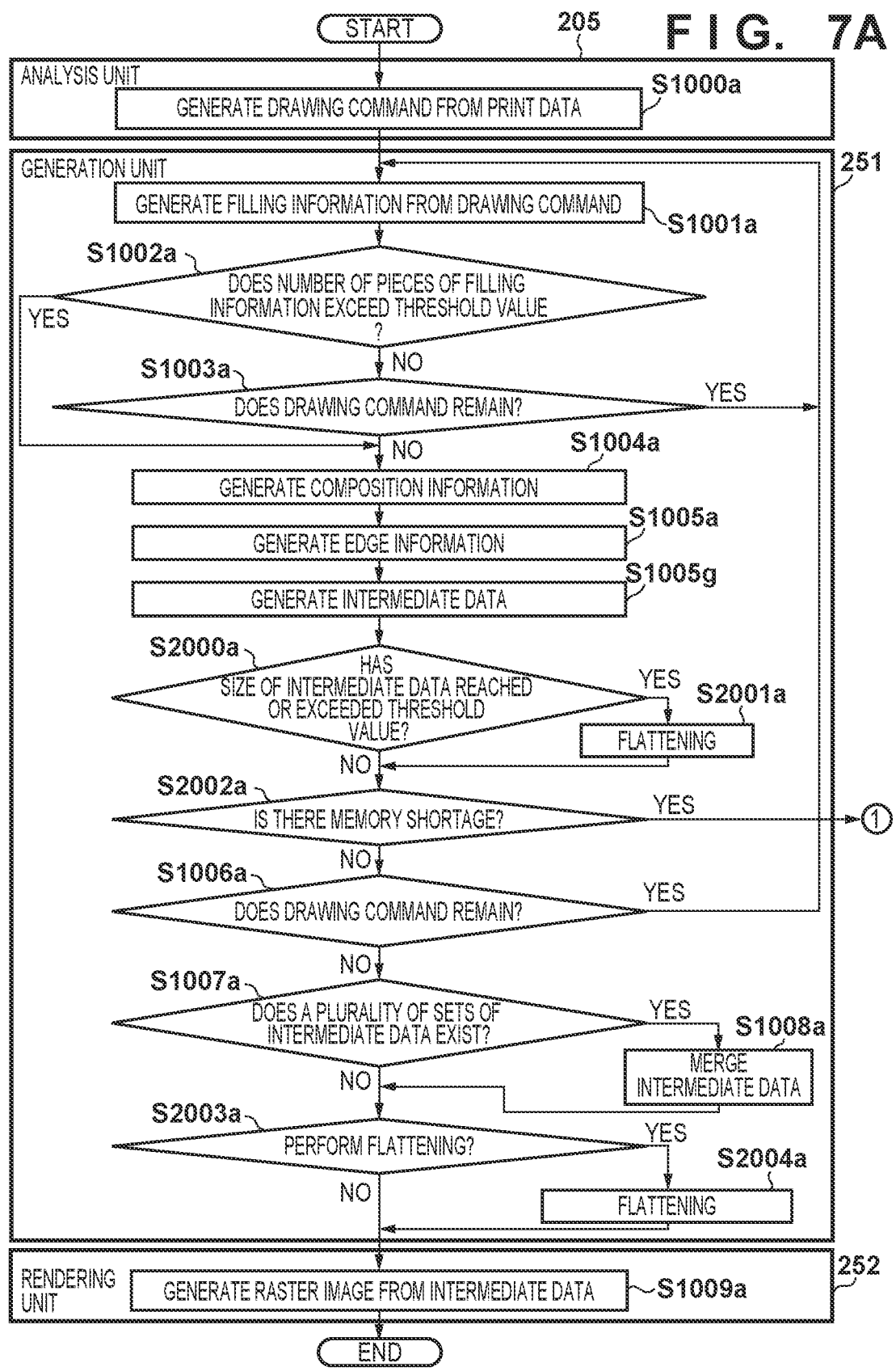
FIG. 7A is a flowchart showing an operation of the image processing apparatus 100.
Figure 7B:
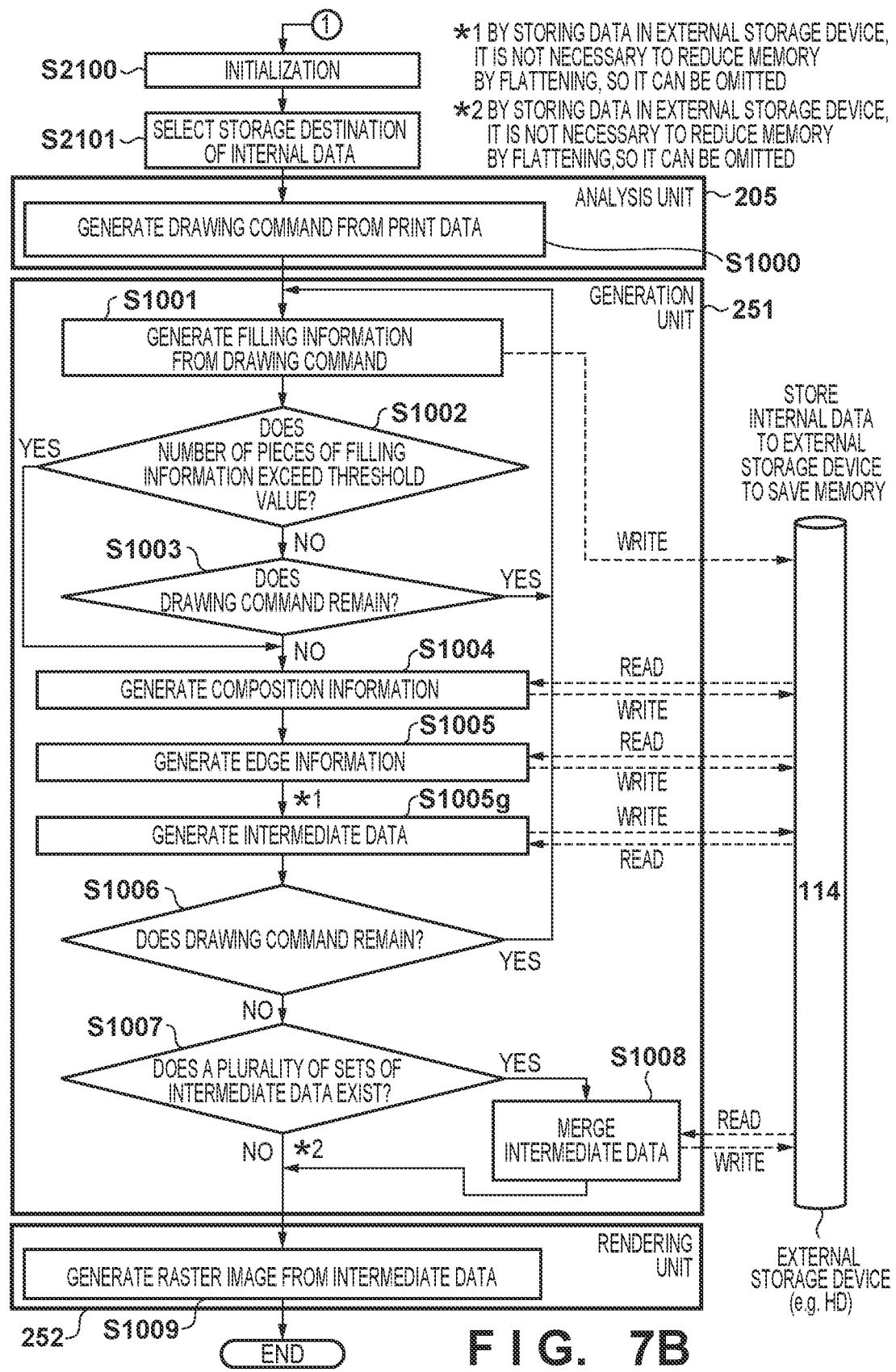
FIG. 7B is a flowchart showing an operation of the image processing apparatus 100.

The operation of the image processing apparatus 100 according to the present embodiment will be described, referring to the flowcharts of FIGS. 7A and 7B. At the start of the process according to the flowcharts of FIGS. 7A and 7B, the image processing apparatus 100 is set to operate in the first mode.

At step S1000a, the analysis unit 205 analyzes the print data 203, and generates a drawing instruction (drawing command) for each page. At step S1001a, the generation unit 251 generates, from a drawing command of a page, filling information related to filling of the page, and holds the generated filling information in the RAM 102.

At step S1002a, the generation unit 251 determines whether or not the number of pieces of filling information in the page generated at step S1001a has exceeded a threshold value. In a case where, as a result of the determination, the number of pieces of filling information in the page generated at step S1001a has exceeded the threshold value, the processing proceeds to step S1004a. On the other hand, in a case where the number of pieces of filling information in the page generated at step S1001a has not exceeded the threshold value, the processing proceeds to step S1003a.

At step S1003a, the generation unit 251 determines whether or not there remains a drawing command of a page yet to be subjected to step S1001a. In a case where, as a result of the determination, there remains a drawing command of a page yet to be subjected to step S1001a, the processing proceeds to step S1001a. On the other hand, in a case where there remains no drawing command of a page yet to be subjected to step S1001a, the processing proceeds to step S1004a.

At step S1004a, the generation unit 251 generates, from a drawing command of the page, composition information related to the composition of objects on the page, and holds the generated composition information in the RAM 102.

At step S1005a, the generation unit 251 generates, from a drawing command of the page, edge information related to edges of objects on the page and holds the generated edge information in the RAM 102.

At step S1005g, the generation unit 251 generates intermediate data of the page, referring to the internal data held in the RAM 102 as appropriate, and stores the generated intermediate data in the RAM 102.

At step S2000, the generation unit 251 determines whether or not the size of the intermediate data generated at step S1005g has reached or exceeded a threshold value. In a case where, as a result of the determination, the size of the intermediate data generated at step S1005g has reached or exceeded the threshold value, the processing proceeds to step S2001a. On the other hand, in a case where the size of the intermediate data generated at step S1005g has not reached the threshold value, the processing proceeds to step S2002a. At step S2001a, the generation unit 251 performs the aforementioned flattening of the intermediate data generated at step S1005g.

At step S2002a, the generation unit 251 checks that there is no memory shortage (CURRENT_USAGE). In a case where, as a result of the checking, there is memory shortage (where no more intermediate data or internal data can be stored in the memory area allocated to the RAM 102), the processing proceeds to step S2100. At the time point when the processing has proceeded to step S2100, the image processing apparatus 100 is set to operate in the second mode.

On the other hand, in a case where there is no memory shortage (where intermediate data or internal data can still be stored in the memory area allocated to the RAM 102), the processing proceeds to step S1006a.

At step S1006a, the generation unit 251 determines whether or not there remains a drawing command of a page yet to be subjected to step S1001a. In a case where, as a result of the determination, there remains a drawing command of a page yet to be subjected to step S1001a, the processing proceeds to step S1001a. On the other hand, in a case where there remains no drawing command of a page yet to be subjected to step S1001a, the processing proceeds to step S1007a.

At step S1007a, the generation unit 251 determines whether or not there exists a plurality of sets of generated intermediate data. In a case where, as a result of the determination, there exists a plurality of sets of generated intermediate data, the processing proceeds to step S1008a, or the processing proceeds to step S2003a in a case where there exists a single set of intermediate data.

At step S1008a, the generation unit 251 merges the "plurality of sets of intermediate data" stored in the HD 114 into a single set of intermediate data and stores, in the HD 114, the single set of intermediate data generated by the merging.

At step S2003a, the generation unit 251 determines whether or not to perform flattening on the intermediate data. In a case where, as a result of the determination, flattening is to be performed on the intermediate data, the processing proceeds to step S2004a, or the processing proceeds to step S1009a in a case where flattening is not to be performed on the intermediate data.

At step S2004, the generation unit 251 performs flattening of the intermediate data. At step S1009a, the rendering unit 252 generates a raster image by performing rendering using the intermediate data stored in the HD 114. The generated raster image is output by the output unit 207 to an appropriate output destination as the output data 212.

At step S2100, the CPU 101 performs initialization of image processing. The initialization includes the processes of setting the image processing apparatus 100 to operate in the second mode, and deleting (clearing) the intermediate data held in the RAM 102.

At step S2101, the CPU 101 changes the storage destination of the internal data from the RAM 102 to the HD 114. Subsequent processes are similar to those of the first embodiment (FIG. 5), and therefore description thereof will be omitted.

Third Embodiment

In the second embodiment, upon occurrence of memory shortage in the RAM 102, the operation switches from the first mode to the second mode. In the present embodiment, the operation switches from the first mode to the second mode when a threshold time period has elapsed since the start of the intermediate data generation process.

Figure 8A:
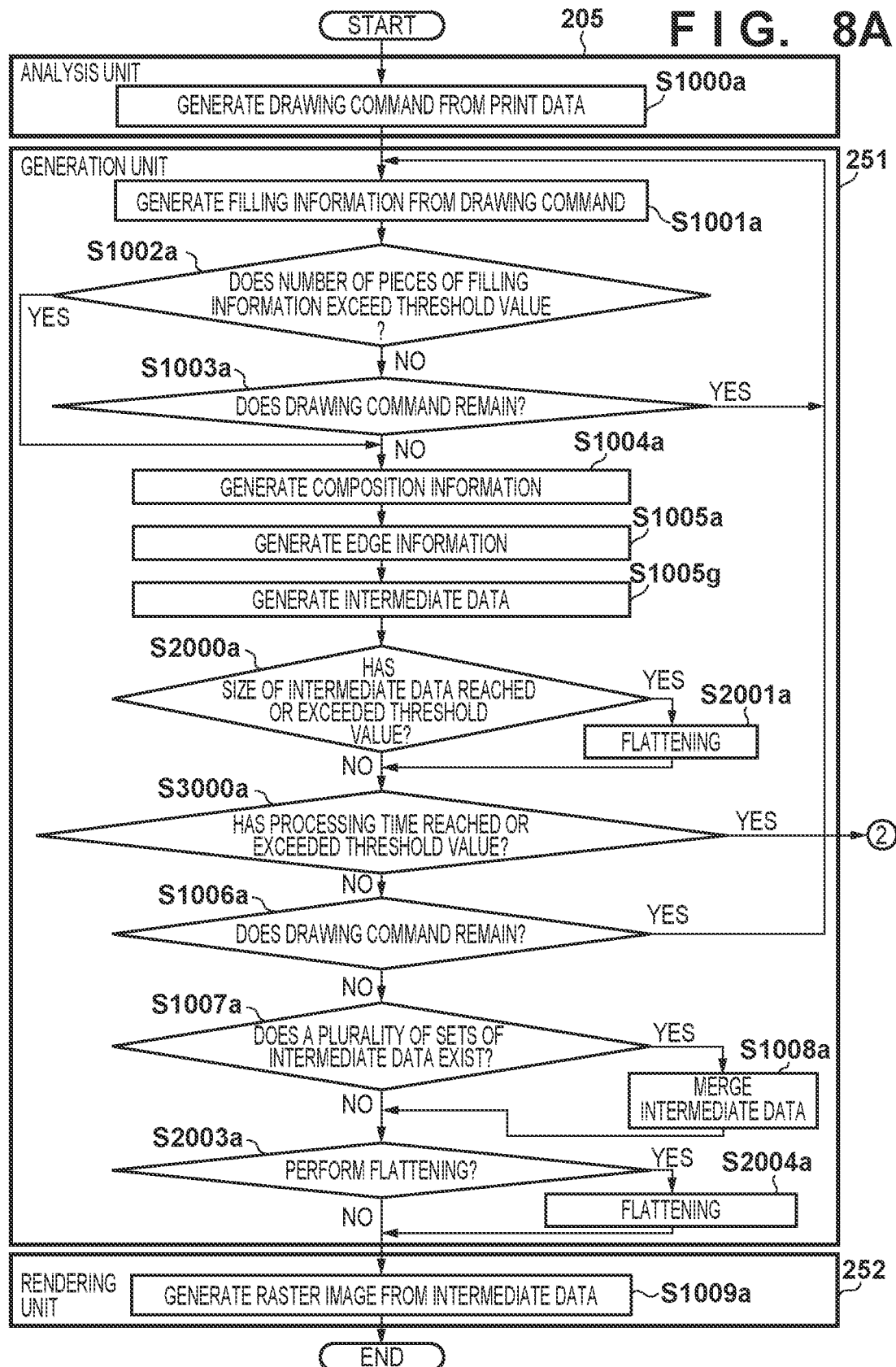
FIG. 8A is a flowchart showing an operation of the image processing apparatus 100.
Figure 8B:
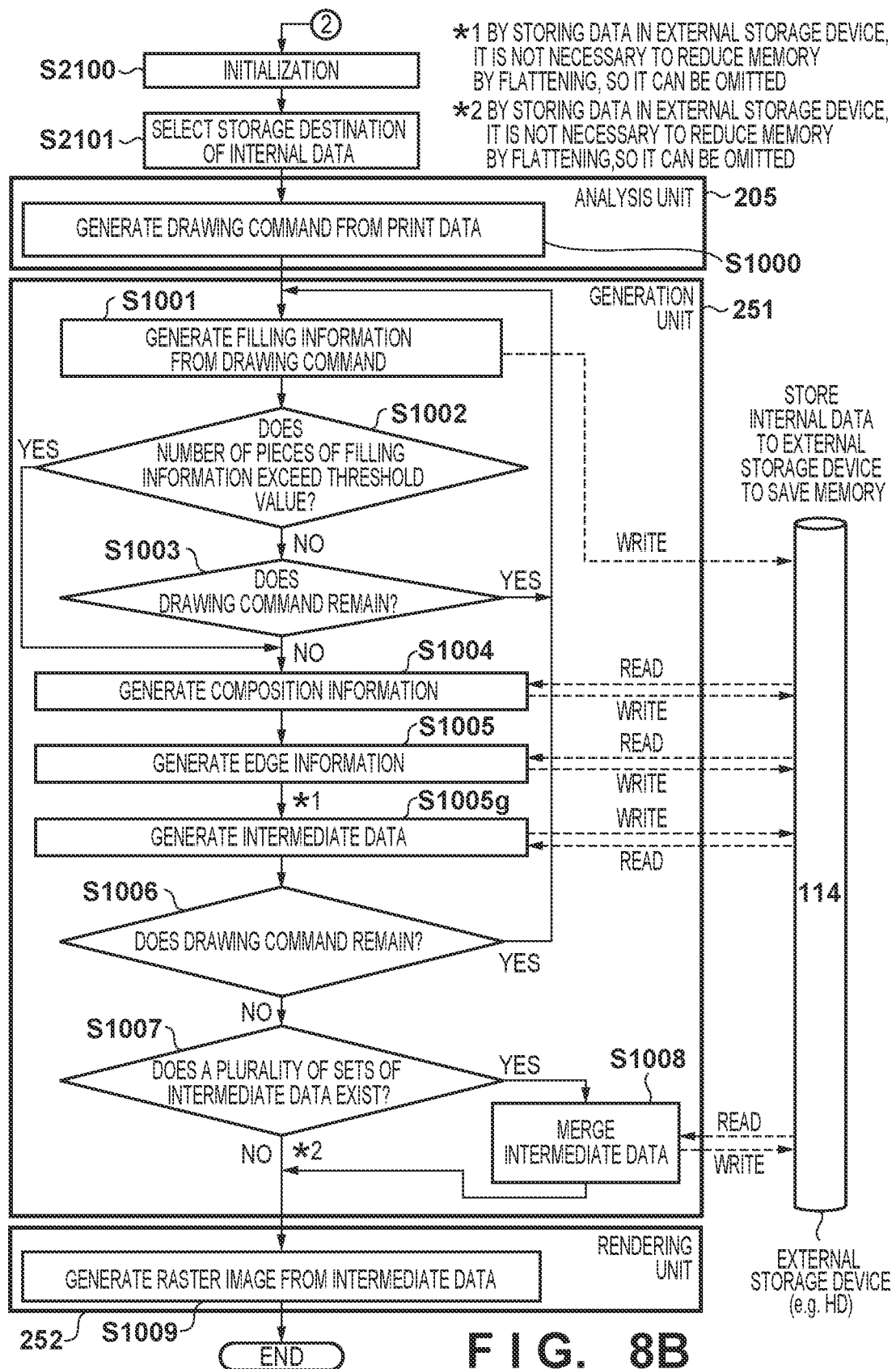
FIG. 8B is a flowchart showing an operation of the image processing apparatus 100.

The operation of the image processing apparatus 100 according to the present embodiment will be described, referring to the flowcharts of FIGS. 8A and 8B. In the following, only the parts different from the processing in accordance with the flowcharts of FIGS. 7A and 7B will be described, assuming that the other parts are similar to the second embodiment unless otherwise stated below.

At step S3000, the generation unit 251 determines whether or not the elapsed time since the start of the intermediate data generation process (time measured by a timer function provided in the CPU 101) has reached or exceeded a threshold time period (threshold value). In a case where, as a result of the determination, the elapsed time since the start of the intermediate data generation process has reached or exceeded the threshold time period, the processing proceeds to step S2100. On the other hand, in a case where the elapsed time since the start of the intermediate data generation process has not reached the threshold time period, the processing proceeds to step S1006a.

Here, the timing of starting measurement of the "elapsed time since the start of the intermediate data generation process" is not limited to a specific timing, and may be, for example, the timing of starting the process of step S1000a, or the timing of starting the process of step S1001a.

Figure 4:
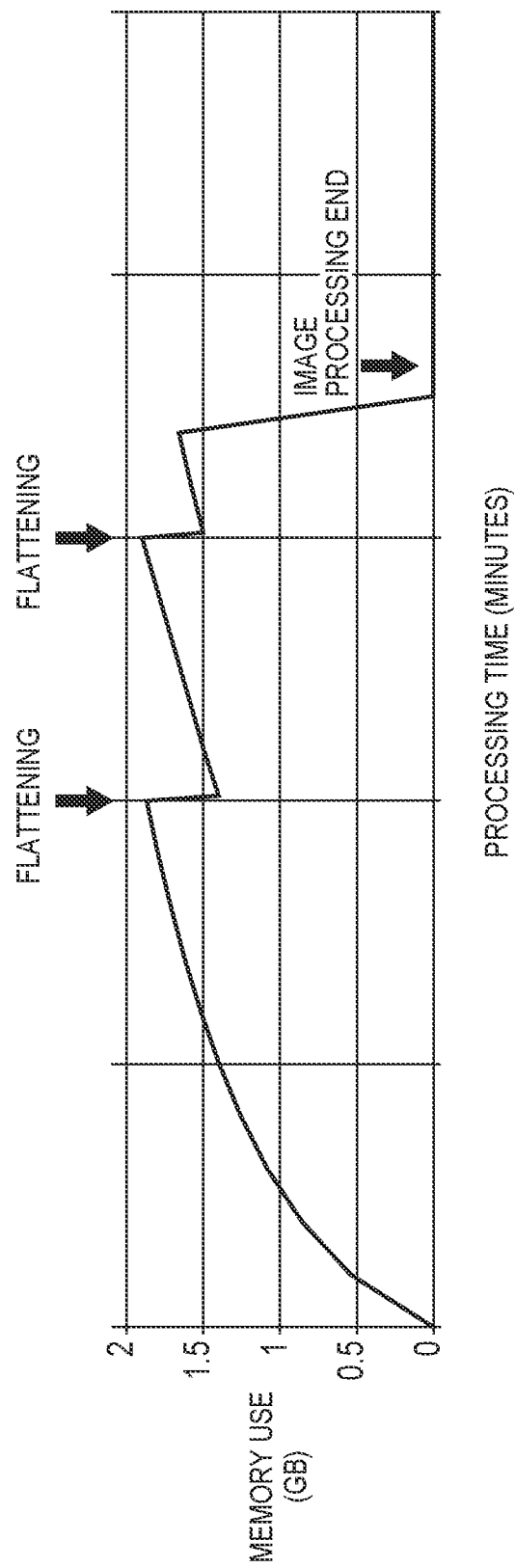
FIG. 4 illustrates how memory usage is reduced by flattening.
Figure 9:
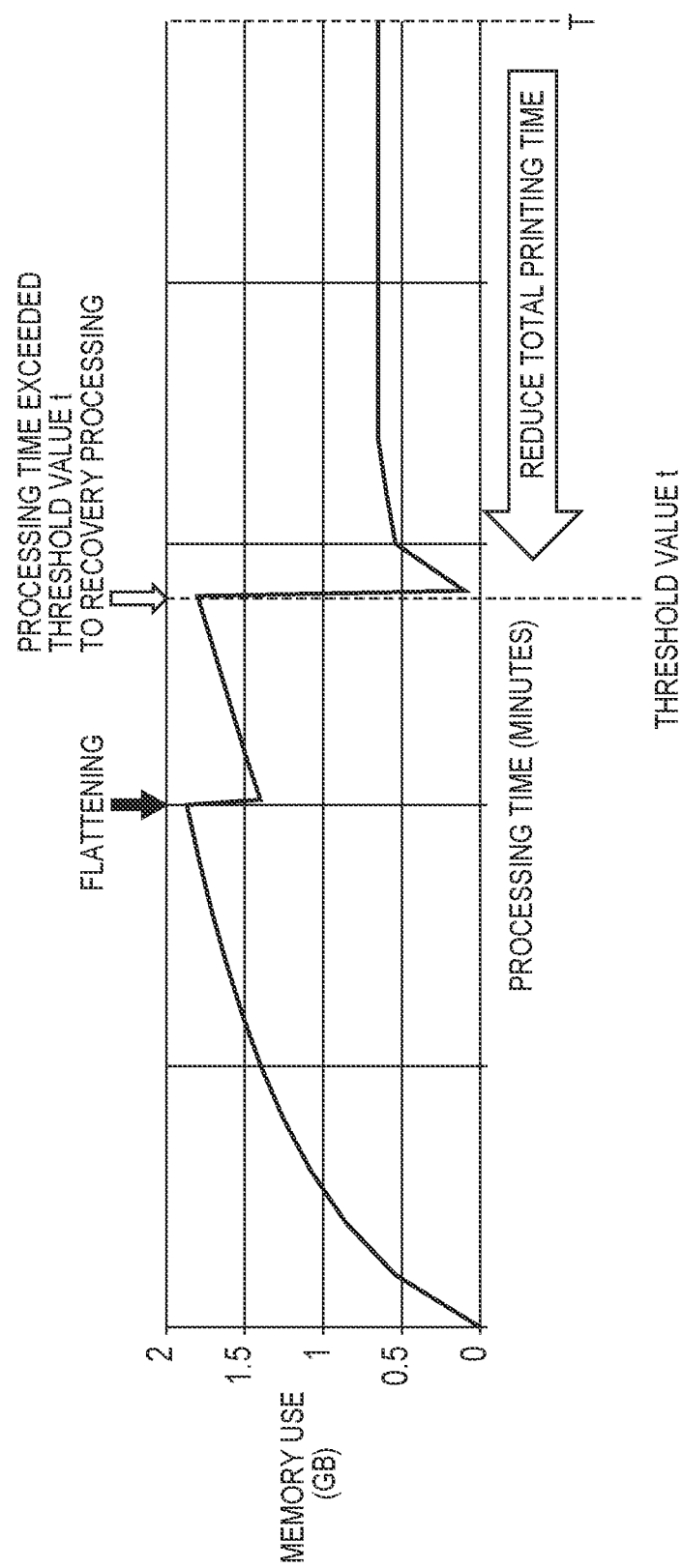
FIG. 9 illustrates an example of performance improvement by replacing step S2002 with step S3000.

FIG. 9 illustrates an example of performance improvement by replacing step S2002 with step S3000. Similarly to FIG. 4, the vertical axis indicates the usage (GB) of the RAM 102, and the horizontal axis indicates the processing time (minutes). Here, the maximum value of 2 GB along the vertical axis is assumed to be the maximum capacity of the RAM 102. The predetermined threshold time period is assumed here to be t minutes.

In FIG. 6, memory usage has reached the maximum value of 2 GB at a time point T of the processing time, resulting in memory shortage and transition to step S2100. On the other hand, in FIG. 9, it is possible to transition to step S2100 at an earlier timing than in FIG. 6, which allows for reducing the total printing time.

As has been described above, transitioning from the first mode to the second mode in accordance with a predetermined threshold time period t also allows for reducing the total printing time for print data that takes time due to flattening to reach memory shortage of the RAM 102.

Fourth Embodiment

Figure 10A:
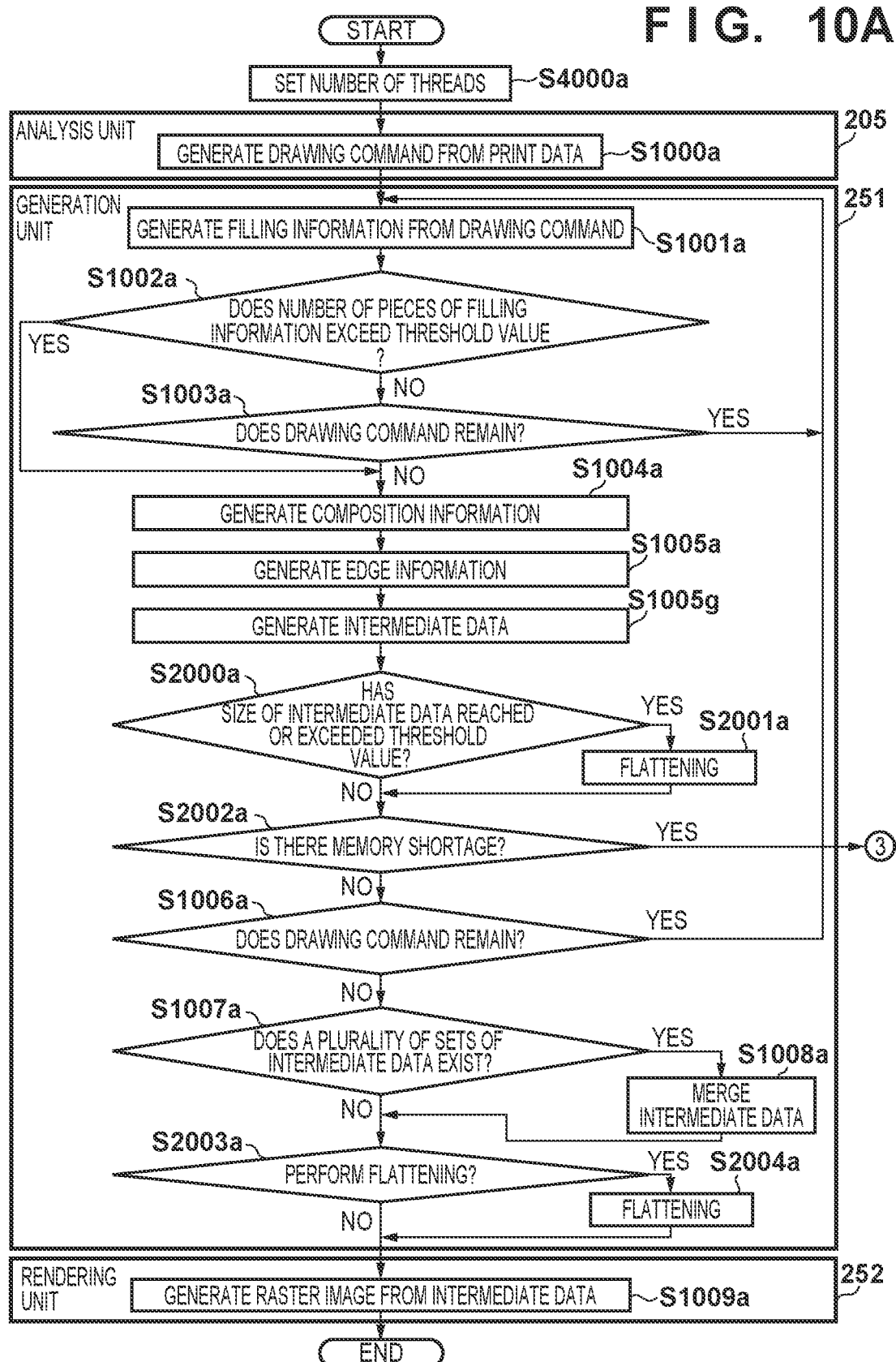
FIG. 10A is a flowchart showing an operation of the image processing apparatus 100.
Figure 10B:
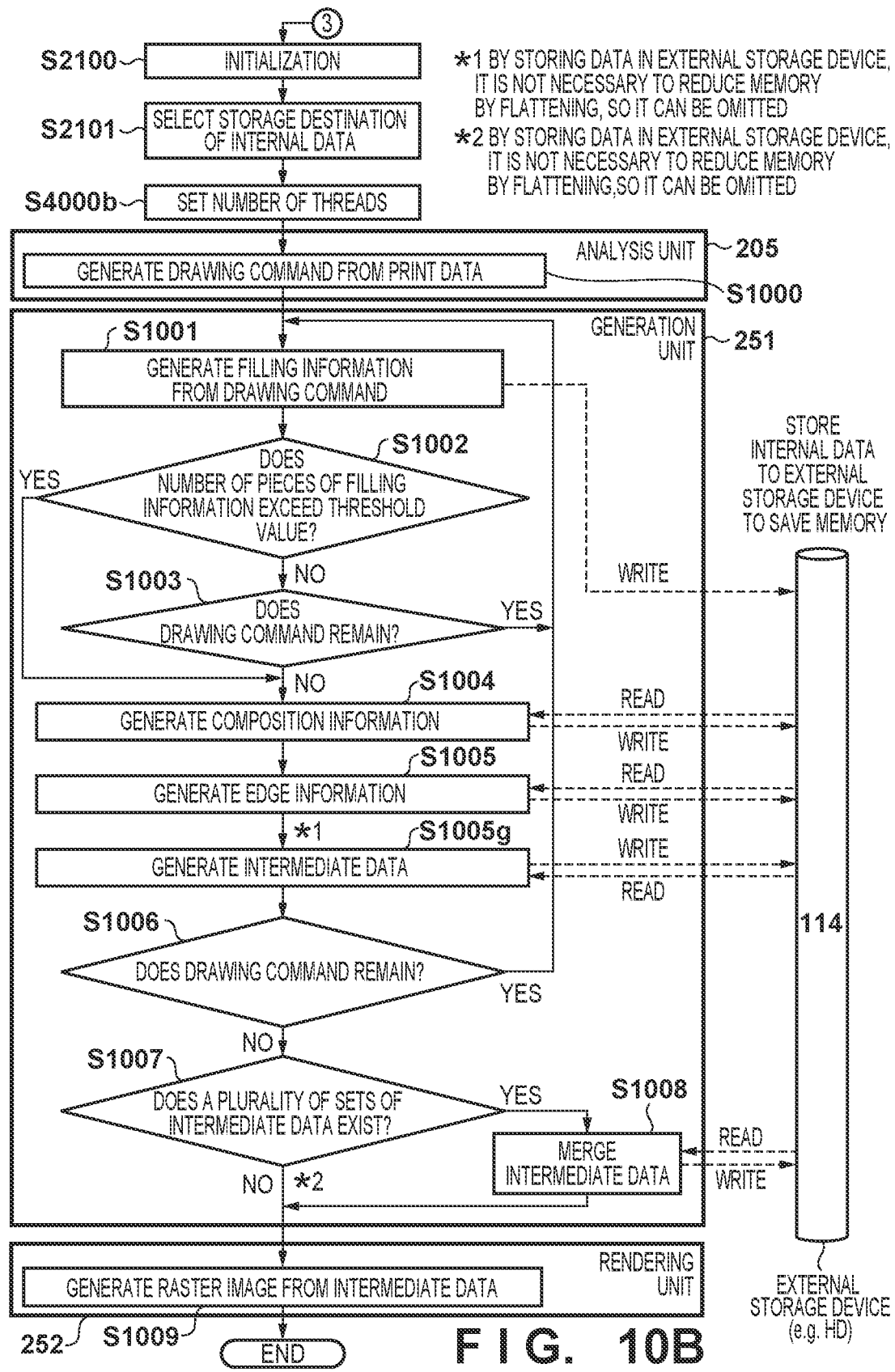
FIG. 10B is a flowchart showing an operation of the image processing apparatus 100.

The image processing apparatus 100 can also operate in a multi-thread manner. The operation of the image processing apparatus 100 according to the present embodiment will be described in accordance with the flowcharts of FIGS. 10A and 10B. In the following, only the parts different from the processing in accordance with the flowcharts of FIGS. 7A and 7B will be described, assuming that the other parts are similar to the second embodiment unless otherwise stated below.

At step S4000*a*, the CPU 101 sets multi thread operation. Accordingly, in the first mode, the image processing apparatus 100 operates in a multi-thread manner. At step S4000*b*, the CPU 101 sets single-thread operation. Accordingly, in the second mode, the image processing apparatus 100 operates in a single-thread manner.

When operating in a multi-thread manner, there is a tendency to use the RAM 102 more than when operating in a single-thread manner. Therefore, it is also possible to operate in a single-thread manner in the second mode to save the capacity of the RAM 102 so as to prevent memory shortage in the RAM 102.

In addition, both the RAM 102 and the HD 114 may be used for storing the internal data. For example, it is also conceivable to store, in the HD 114, drawing instructions (e.g., drawing an object including a large image, etc.) that is apt to cause occurrence of memory shortage of the RAM 102, and store the other drawing instructions in the RAM 102.

With regard to the timing of storing in the HD 114, the use situations of the RAM 102 is checked in real time during the generation process of the intermediate data and, upon having confirmed that there is no problem, the internal data is stored in the RAM 102 and the processing continues thereafter. Otherwise, in a case where it is determined that memory shortage is likely to occur, the storage destination may be changed to the HD 114.

Note that the specific numerical values used in the aforementioned embodiments, execution timings of the processes, execution order of the processes, or the like have been taken as examples to provide specific descriptions and the embodiments are not intended to be limited to these examples.

Further, some or all of the embodiments described above may be used in combination as appropriate. Further, some or all of the embodiments described above may be used in a selective manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-010327, filed Jan. 24, 2020 which is hereby incorporated by reference herein in its entirety.

What is claimed is:

1. An image processing apparatus comprising:
one or more processors; and
a memory storing executable instructions which, when executed by the one or more processors, cause the image processing apparatus to function as:
a generation unit configured to generate data which is used for performing rendering process based on print data, and store the generated data in a non-volatile memory of the image processing apparatus in a case where memory shortage in a volatile memory of the image processing apparatus occurs; and
a rendering unit configured to generate a raster image by performing the rendering process based on the data,
wherein the image processing apparatus operates in a multi-thread manner until the memory shortage occurs in the volatile memory, and operates in a single-thread manner after the occurrence of the memory shortage in the volatile memory.

2. The image processing apparatus according to claim 1, wherein, in a case where the memory shortage in the volatile memory does not occur, the generation unit does not store the generated data in the non-volatile memory.

3. The image processing apparatus according to claim 1, wherein the generation unit generates the data based on a drawing command generated from the print data.

4. The image processing apparatus according to claim 1, wherein the data include filling information related to filling in a page, composition information related to composition of objects on the page, and edge information related to edges of the objects on the page.

5. The image processing apparatus according to claim 1, wherein, in a case where the memory shortage in the volatile memory occurs, the generation unit clears the volatile memory and subsequently stores the data in the non-volatile memory.

6. The image processing apparatus according to claim 1, wherein the instructions, when executed by the one or more processors, further cause the image processing apparatus to function as a printing unit configured to print the raster image generated by the rendering unit.

7. An image processing method performed by an image processing apparatus, the image processing method comprising:
   generating data which is used for performing rendering process based on print data;
   storing the generated data in a non-volatile memory of the image processing apparatus in a case where memory shortage in a volatile memory of the image processing apparatus occurs; and
   generating a raster image by performing the rendering process based on the data,
   wherein the image processing apparatus operates in a multi-thread manner until the memory shortage occurs in the volatile memory, and operates in a single-thread manner after the occurrence of the memory shortage in the volatile memory.

8. A non-transitory computer-readable storage medium having stored therein a computer program for causing a computer of an image processing apparatus to function as:
   a generation unit configured to generate data which is used for performing rendering process based on print data, and store the generated data in a non-volatile memory of the image processing apparatus in a case where memory shortage in a volatile memory of the image processing apparatus occurs; and
   a rendering unit configured to generate a raster image by performing the rendering process based on the data,
   wherein the image processing apparatus operates in a multi-thread manner until the memory shortage occurs in the volatile memory, and operates in a single-thread manner after the occurrence of the memory shortage in the volatile memory.

* * * * *